United States Patent
Ardö et al.

(10) Patent No.: US 10,200,631 B2
(45) Date of Patent: Feb. 5, 2019

(54) METHOD FOR CONFIGURING A CAMERA

(71) Applicant: AXIS AB, Lund (SE)

(72) Inventors: Björn Ardö, Lund (SE); Igor Gurovski, Bunkeflostrand (SE)

(73) Assignee: AXIS AB, Lund (SE)

( * ) Notice: Subject to any disclaimer, the term of this patent is extended or adjusted under 35 U.S.C. 154(b) by 273 days.

(21) Appl. No.: 15/015,353

(22) Filed: Feb. 4, 2016

(65) Prior Publication Data
US 2016/0286134 A1 Sep. 29, 2016

(30) Foreign Application Priority Data
Mar. 24, 2015 (EP) .................................. 15160596

(51) Int. Cl.
H04N 7/18 (2006.01)
H04N 5/247 (2006.01)
H04N 5/232 (2006.01)

(52) U.S. Cl.
CPC ......... H04N 5/247 (2013.01); H04N 5/23225 (2013.01); H04N 7/181 (2013.01)

(58) Field of Classification Search
CPC ..... H04N 5/247; H04N 5/23225; H04N 7/181
USPC ....................................................... 348/159
See application file for complete search history.

(56) References Cited

U.S. PATENT DOCUMENTS

| | | | |
|---|---|---|---|
| 7,602,419 B2 | 10/2009 | Kiuchi | |
| 7,714,911 B2 | 5/2010 | Yoshida | |
| 8,510,381 B1 | 8/2013 | Birand et al. | |
| 2001/0026318 A1* | 10/2001 | Yonezawa | G08B 13/19645 348/159 |
| 2006/0146765 A1 | 7/2006 | Van De Sluis et al. | |
| 2009/0138829 A1* | 5/2009 | Ogikubo | G11B 27/034 715/853 |
| 2009/0216775 A1* | 8/2009 | Ratliff | G06Q 10/08 |
| 2011/0055739 A1 | 3/2011 | MacFarlane et al. | |
| 2012/0229648 A1 | 9/2012 | Kass | |
| 2014/0002664 A1* | 1/2014 | Hanabusa | H04N 7/181 348/159 |
| 2014/0270682 A1 | 9/2014 | Carey | |
| 2014/0340477 A1* | 11/2014 | Onai | G06T 13/80 348/42 |

FOREIGN PATENT DOCUMENTS

| | | |
|---|---|---|
| CN | 102752572 A | 10/2012 |
| DE | 19531593 A1 | 3/1997 |
| EP | 715453 A2 | 6/1996 |
| JP | 2001111866 A | 4/2001 |
| WO | 9730375 A1 | 8/1997 |
| WO | 2014094846 A1 | 6/2014 |

* cited by examiner

*Primary Examiner* — Allen C Wong
(74) *Attorney, Agent, or Firm* — Volpe and Koenig, P.C.

(57) ABSTRACT

The present invention relates to a method for configuring a first camera. The method comprises presenting a visual representation of a second camera in a camera managing device, presenting a visual representation of the first camera in the camera managing device, connecting the visual representation of the first camera to the visual representation of the second camera, transferring, to the first camera, settings information related to the second camera in response to said connecting of the visual representation of the first camera to the visual representation of the second camera, and configuring the first camera using the transferred settings information.

6 Claims, 5 Drawing Sheets

METHOD FOR CONFIGURING A CAMERA

CROSS REFERENCE TO RELATED APPLICATION

This application claims the benefit of European Patent Application No 15160596.1 filed on Mar. 24, 2015, which is incorporated by reference as if fully set forth.

FIELD OF INVENTION

The present invention relates to a method for configuring a camera and in particular for configuring cameras connected to a communication network.

BACKGROUND

It is becoming increasingly important to have surveillance and monitoring systems that are arranged to survey and monitor large areas. Such large area may be an exterior area or an interior area that may require or benefit from such monitoring. An exterior area may for instance be an area such as a city, a car park area, a sports arena, or any other outdoor area, and an interior area may for instance be an area such as a shopping centre, a store, a warehouse, a storage facility, an office, a sports arena, or any other indoor area. The quality of captured images and videos becomes more and more important as identification of both persons and events are increasingly important. In order to achieve this, the number of cameras in a monitoring system is often increased, the quality required of the captured imagery is increased, and the knowledge and control of the position and settings of the cameras become more important. The increasing number of cameras in a system may increase the number of cameras that need to be replaced for one reason or another. The addition of new cameras and the increased risk of cameras needing to be replaced make it important to facilitate installation of new additional cameras and, maybe more important, to facilitate replacement of deteriorating, broken, or malfunctioning cameras.

One way of facilitating installation of new or replacement cameras is to make is easy to make the new cameras provide a similar user experience as the existing and/or replaced cameras. This may be performed by using the same or similar configurations in the cameras of the system.

In U.S. Pat. No. 7,602,419, photography mode setting information is transferred from one camera to another camera via a connection, e.g., a USB cable or a LAN, connected to the two cameras. The cameras are selected by being physically connected to each other or to a PC. Hence, the person performing the transferring of the photography mode settings between the cameras has to physically get the cameras in close proximity to each other. This is not a problem for the type of cameras described in the patent as they are cameras for handheld image capturing. However, this may be difficult in a monitoring system.

SUMMARY

One object of the present invention is to provide a method and a system for configuring cameras.

The object is achieved by means of a method according to claim 1 and by means of a system according to claim 6. Further embodiments of the invention are presented in the dependent claims.

In particular, according to at least one embodiment, the method for configuring a first camera comprises presenting a visual representation of a second camera in a camera managing device, presenting a visual representation of the first camera in the camera managing device, connecting the visual representation of the first camera to the visual representation of the second camera, transferring, to the first camera, settings information related to the second camera in response to said connecting of the visual representation of the first camera to the visual representation of the second camera, and configuring the first camera using the transferred settings information. One advantage of selecting the cameras, transferring the settings information, and configuring the camera as defined above is that the configuration of a camera is simplified both for the user of the system and for the devices. The configuration may be performed simply by the user selecting the relevant cameras.

The settings information may include identification of a physical position of the second camera. This may be an advantage in that a replacement camera may easily be set up having the same settings as the previous camera. This is particularly useful in systems where a camera managing system or a monitoring managing system relies on the position of each camera.

Said settings information may include any information type from the group of white balance, frame rate, exposure, compression level, encoding format, and triggering event.

Further, the method may include positioning the visual representation of the second camera in a map presented on the camera managing device. One advantage of this feature is that the identification of cameras is facilitated. Moreover, keeping such a map up to date facilitates service, managing, and operation of the cameras.

Moreover, the method may further include receiving in the camera managing device a position signal identifying coordinates of the position of the camera managing device. This facilitates selection of a camera that the settings information is to be inherited from, especially in cases when the camera managing device is carried by a person replacing the camera.

In some embodiments the method further comprises displaying at the camera managing device a map of the surroundings of the camera managing device by selecting a map view including the coordinates of the position of the camera managing device.

Moreover, the method may also comprise the camera managing device identifying and visually presenting all cameras within a predetermined distance from the coordinates of the position of the camera managing device. This further facilitates the identification of cameras for selection and/or replacement.

According to another aspect of the invention the monitoring system includes cameras and a camera managing device all connected to a communication network. Further, the camera managing device and the cameras are configured to perform the method as described above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 1:
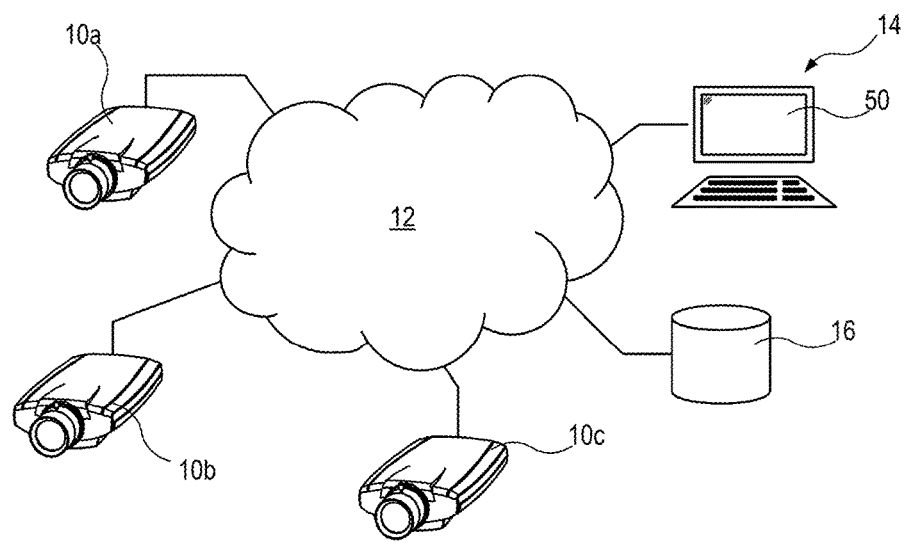
FIG. 1 is a schematic diagram over a system in which embodiments of the invention may be implemented.

The present invention relates to systems of networked cameras, see FIG. 1 for a schematic example of such a system. The system may for example be a monitoring or a surveillance system. The schematic example includes cameras 10a, 10b and 10c which are connected to a communication network 12 and a camera managing device 14 also being connected to the communication network 12. The camera managing device 14 having a display 50. The cameras 10a-10c may be network attached motion video cameras, e.g., a type of camera provided by Axis Communications AB, Emdalavägen 14, SE-223 69 Lund, Sweden, "www.axis.com", that are configured for communication over a network. The communication network 12 may be any communication network, e.g., a Local Area Network (LAN), a Wide Area Network (WAN), the Internet, a public switched telephone network, a local telephone network, a wired network, a wireless network, a cellular network, etc. The camera managing device 14 may be any device enabled to interact with a user via an interface and enabled to access stored information relating to cameras 10a-10c connected to the network. Hence, the camera managing device 14 may be a personal computer, a work station, a thin client, a smart phone, a tablet, etc. The camera managing device 14 may be arranged to by itself store the information relating to the cameras 10a-10c or it may be arranged to access and store data in an information server 16 being separate from the camera managing device 14. This information may alternatively or complementarily be stored in the cameras 10a-10c and may be accessed via the communication network 12. Said information related to the cameras 10a-10c is hereinafter referred to as settings information and may include any information related to the camera, e.g., any combination of information from the group of geographical position, viewing direction, white balance, frame rate, exposure settings, compression level, encoder settings, encoding format, transmission format, triggering events, settings for alarms, scheduling settings, etc. This list is not exhaustive.

Figure 2:
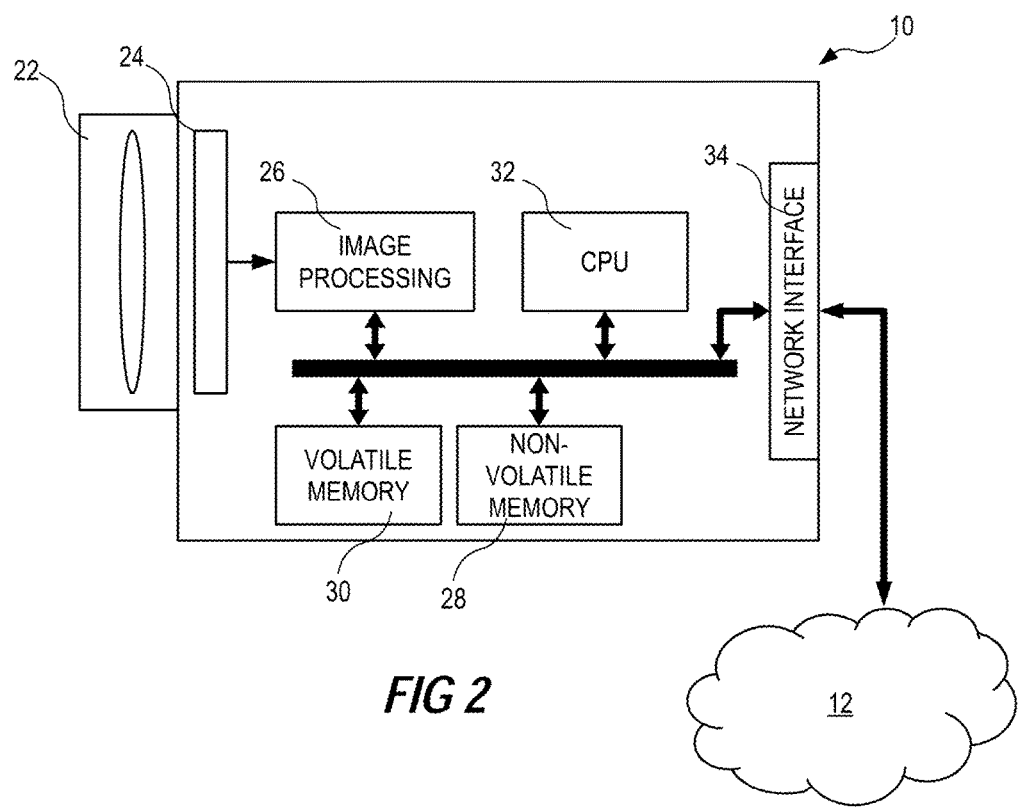
FIG. 2 is a schematic block diagram over a camera that may be used in embodiments of the invention.

Now referring to FIG. 2, a camera 10 according to at least some embodiments of the invention includes devices and features normal for the function of an image capturing device such as a camera. For instance, the camera 10 includes optics 22 for focusing light from a scene to be captured onto an image sensor 24. Further it includes an image processing arrangement 26 being configured to generate an image or an image stream in a predetermined format and being configured in accordance with settings registered in the camera 10 and/or in an external storage device, e.g. an information server 16 as shown in FIG. 1. Settings registered in the camera 10 may be stored in a non-volatile memory 28 for long term storage or be temporarily downloaded to a volatile memory 30 for temporary use. General camera operations, general communication operations, general interface operations, etc., may be performed by means of a central processing unit 32, CPU, executing program code stored in the volatile memory 30 and/or the non-volatile memory 28.

Moreover, the camera 10 includes a network interface 34 for transmitting captured image stream and/or other data relating to the camera 10 or the captured images via the communication network 12 and for receiving instructions and/or data for controlling settings of the camera 10 via the communication network 12. All or a subset of the settings information relating to the camera 10, discussed above, may be stored in the non-volatile memory 28. In embodiments wherein settings information is stored in the camera 10, the camera is configured to transmit settings information to a specified address upon receipt of a request from the camera managing device 14. Such transmission in response to a request from the camera managing device 14 may be executed by the CPU 32 executing program code implementing this functionality.

The network interface 34 may be implementing any network protocol suitable for transfer of video streams in the communication network 12 in which the camera 10 is connected. For example, protocols implemented could be Transmission Control Protocol (TCP), User Datagram Protocol (UDP), Remote Desktop Protocol (RDP), Internet Protocol (IP), and the like. The camera 10 may thus be any network enabled camera implementing normal camera functions for capturing imagery of a scene and which camera is enabled to change settings and or configuration remotely via the network.

Figure 3:
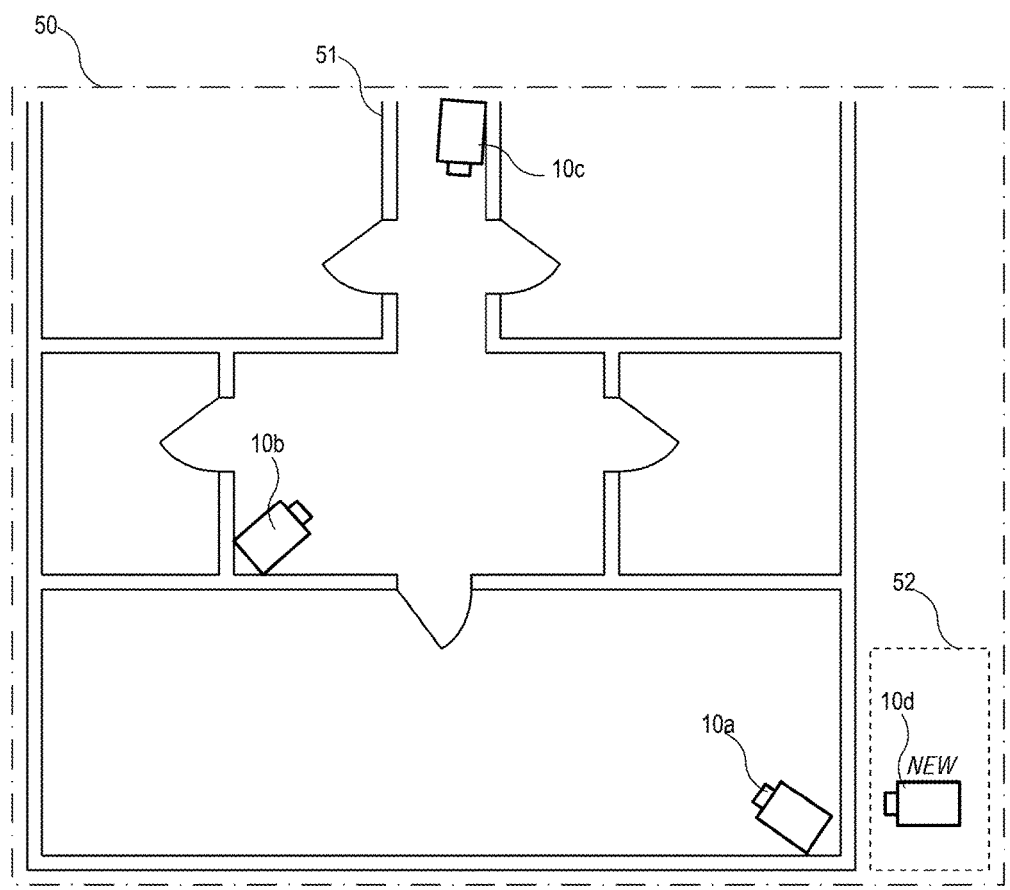
FIG. 3 is a schematic view of an example map presented on a display in at least some embodiments of the invention.
Figure 4:
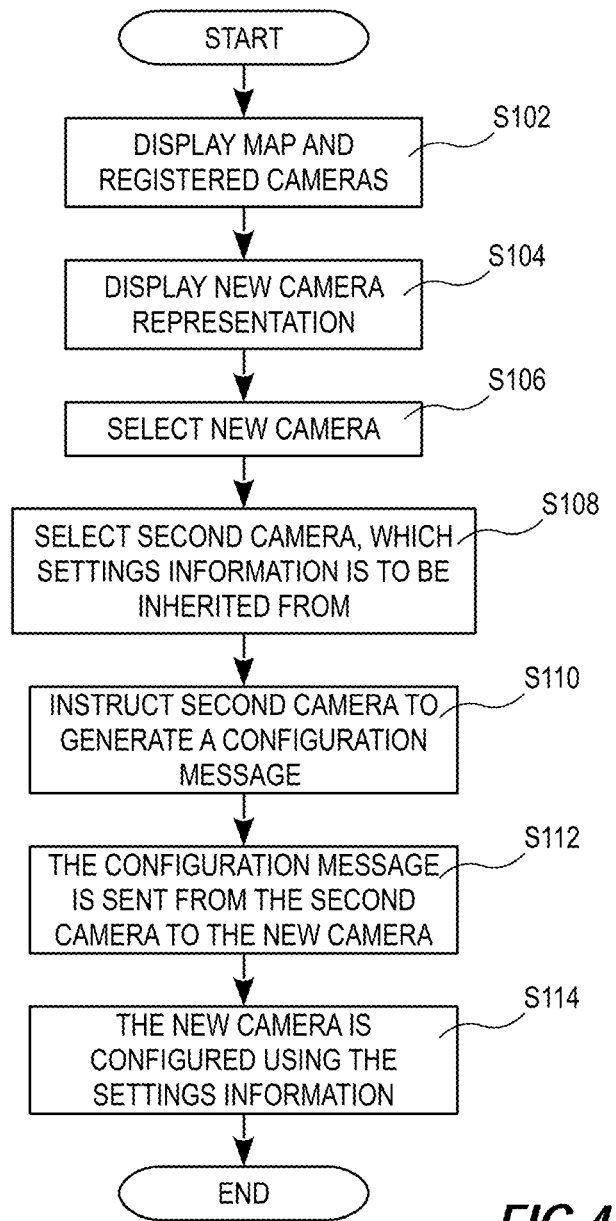
FIG. 4 is a flowchart of a configuration process according to at least some embodiments of the invention.

Now referring to FIGS. 3 and 4, according to at least some embodiments of the invention, cameras of the system may be configured by a person operating a camera managing device 14 having a display 50. The camera managing device displays a map 51 over at least a portion of a monitored area and presents a visual representation of each of the cameras 10a-10c which is registered as installed in these areas, S102. The cameras 10a-10c may be presented at positions in the map 51 corresponding to the real geographical position of the cameras 10a-10c and each camera 10a-10c may be represented by a symbol that resembles a camera. A representation of a new camera 10d, not yet configured with its position, is displayed in a predetermined area 52 of the display and clearly indicated as a new camera, i.e. not yet configured with at least geographical position, S104. The representation of the new camera 10d may also be a symbol that resembles a camera. The new camera 10d has been connected to the same communication network 12 as the rest of the cameras 10a-10c and the camera managing device 14 are connected to. Further, the camera 10*d* may be a camera 10*d* that previously has been automatically detected and registered by the system as a new camera 10*d*.

In order to make the new camera 10*d* inherit settings information of a camera 10*a*-10*c* presented in the map 51, the person operating the camera managing device 14 may start by selecting the new camera 10*d* on the display 50 of the camera managing device 14, S106, using any known method of selecting a feature represented in a computer and presented on a display. Then the person operating the camera managing device 14 selects a second camera 10*a*-10*c* from which the new camera 10*d* is to inherit the settings information, S108. This selecting of the new camera 10*d* and the consecutive selection of the second camera 10*a*-10*c* from which the settings information is to be inherited may be implemented as a drag and drop operation, i.e. the person operating the camera managing device may select the symbol of the new camera 10*d* using an electronic pointing device, e.g. a mouse, touch enabled display, a trackball, a touch pad, an electronic stylus, etc., moving the pointing device towards the symbol of the second camera 10*a*-10*c*, and then select the second camera 10*a*-10*c* by releasing or dropping the symbol of the new camera 10*d* on top of the symbol of the second camera 10*a*-10*c*.

In response to the selection of the second camera 10*a*-10*c*, from which the settings information is to be inherited, an instruction for providing a configuration data message is sent to the second camera 10*a*-10*c* and the second camera 10*a*-10*c* generates a configuration data message, S110, including the settings information of itself. Then the second camera 10*a*-10*c* sends the configuration message to the new camera 10*d*, S112. The settings information may include only the position of the second camera 10*a*-10*c* or it may include any combination of settings information as described above. Then when the configuration message including the settings information is received at the new camera 10*d* the new camera 10*d* is configured using these settings, S114. In case the position of the second camera 10*a*-10*c* is to be inherited, the symbol of the new camera 10*d* may replace the symbol of the second camera 10*a*-10*c* on the displayed map 51.

In some embodiments the new camera 10*d* may be a replacement camera for a broken or malfunctioning camera which is not connected to the communication network 12 anymore, i.e. it is not possible to communicate with the malfunctioning or broken camera anymore. Then the selection of the camera to inherit the settings information from may still be performed, despite the camera not being accessible via the network 12, as the system still will have this camera registered and the settings information of each registered camera 10*a*-10*c* may be stored in a storage device 16 connected to the network 12. A storage device 16 connected to the network may be any one of a database server, a file server, a network attached storage, a network share, and the like. The configuration message is then sent to the new camera 10*d* from the storage device 16 instead of from the malfunctioning camera and the settings information in the storage device relating to the new camera 10*d* is also updated with this data.

In embodiments where the camera managing device 14 is a portable device, the camera managing device 14 may be configured to determine its own position, e.g. by means of GPS or any other well-known positioning system. Then the camera managing device 14 may be arranged to only display cameras 10*a*-10*c* positioned in the immediate neighborhood of the position of the camera managing device 14, facilitating the identification of a particular camera. In one embodiment this is achieved by having the camera managing device 14 calculate the distance to the positions of the cameras 10*a*-10*c* registered in the system and compare the distance for each camera to a threshold value and then only present the ones that are positioned at a distance from the camera managing device 14 that is lesser than the threshold value.

In other embodiments the camera managing device 14 does not display a map 51 including camera symbols indicating the position of each camera within the map. In such embodiments each camera 10*a*-10*c* may be identified by text instead. The text may identify the camera model and possibly some other identity differentiating cameras of the same model from each other. The other identifier may be a serial number, a description inserted during installation, etc. The description may be providing information of where the camera is positioned, e.g., room B, hallway, staircase, etc. The new camera 10*d* may be presented by model and the text new camera in such list. Alternatively the camera is presented by an appropriate text in a predetermined area on the display. The selection of the new camera 10*d* and connection of the new camera to the camera it should inherit the settings information from may be performed by drag and drop, simple selection, or any other known way to select two objects on a display where each of the objects is identified by a text.

Figure 5:
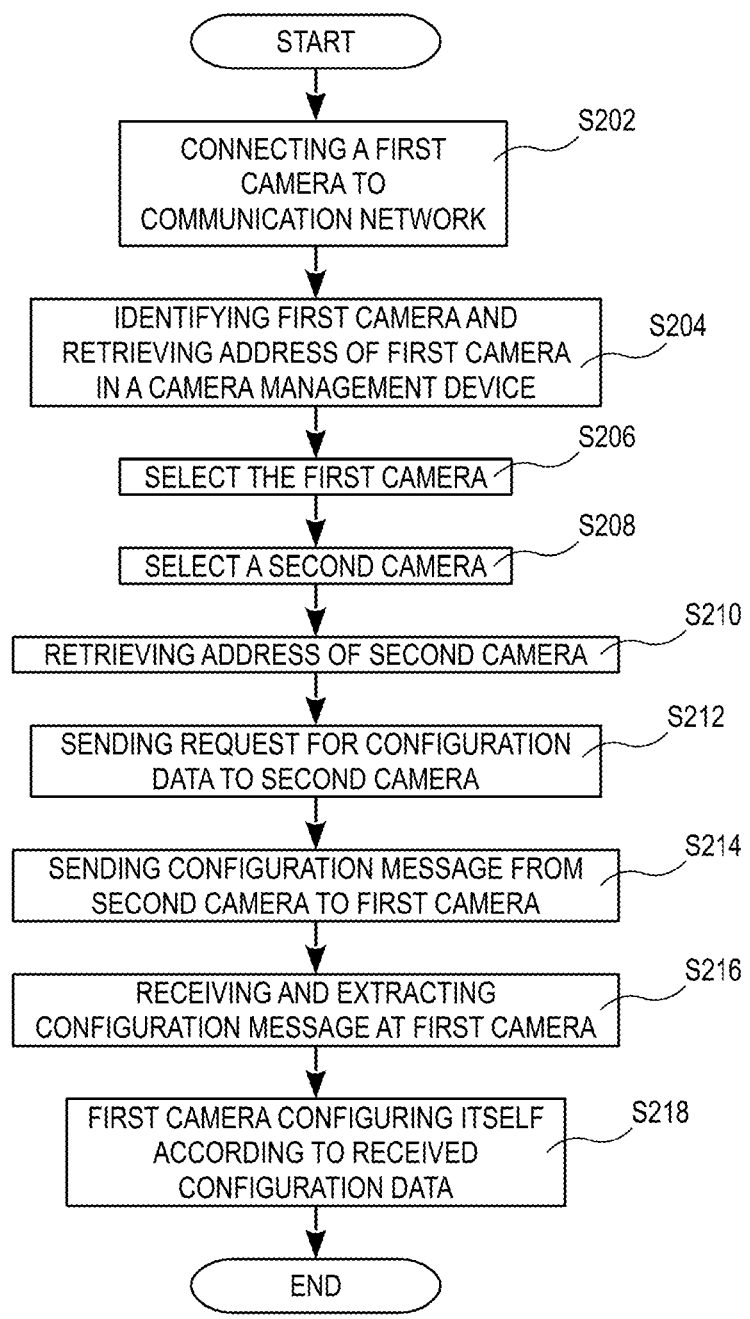
FIG. 5 is a flowchart of a configuration process according to at least some embodiments of the invention.

The configuration process according to some embodiments may be described by the processes depicted in FIG. 5. This process for configuration of a networked camera begins with a new camera 10*d* being connected to the communication network 12, S202. However, the process is also applicable on a camera already connected to the network that is to be reconfigured, therefore the new camera will be referred to as the first camera 10*d* during the description of the rest of the process. In this later case the step S202 of the process in FIG. 5 is simply skipped. Then the first camera 10*d* is detected and identified in the camera management device 14 and the address of the first camera 10*d* is retrieved by the camera management device 14, S204. The first camera 10*d* is selected via a user interface on the camera managing device 14 as the camera to configure, S206. Then a second camera 10*a*-10*c*, already registered in the camera management device 14, is selected via the user interface of the camera managing device 14, S208, and thereby connecting the first camera 10*d* to the second camera 10*a*-10*c* by means of these cameras being consecutively selected. Such consecutive selection using a user interface of the camera managing device 14 may include clicking on graphical representations of each of the cameras 10*a*-10*d* in consecutive order, it may include selecting a graphical representation of the first camera 10*d* and then dragging that representation over to a graphical representation of the second camera 10*a*-10*c* and then releasing or dropping the representation of the first camera onto the representation of the second camera 10*a*-10*c*, it may include selecting textual representations of each of the cameras, and the like.

In response to the selection of the second camera 10*a*-10*c* the camera managing device 14 retrieves the network address to the second camera, S210, and generates and sends a request for settings information together with the network address of the first camera 10*d* to the second camera 10*a*-10*c*, S212. A configuration message including the requested settings information from the second camera 10*a*-10*c* is then sent by the second camera 10*a*-10*c* to the address of the first camera 10*d*, S214. The first camera 10*d* receives the configuration message and extracts the settings information, S216, and then it sets the configuration of itself to the setting information received in the configuration message, S218.

Figure 6:
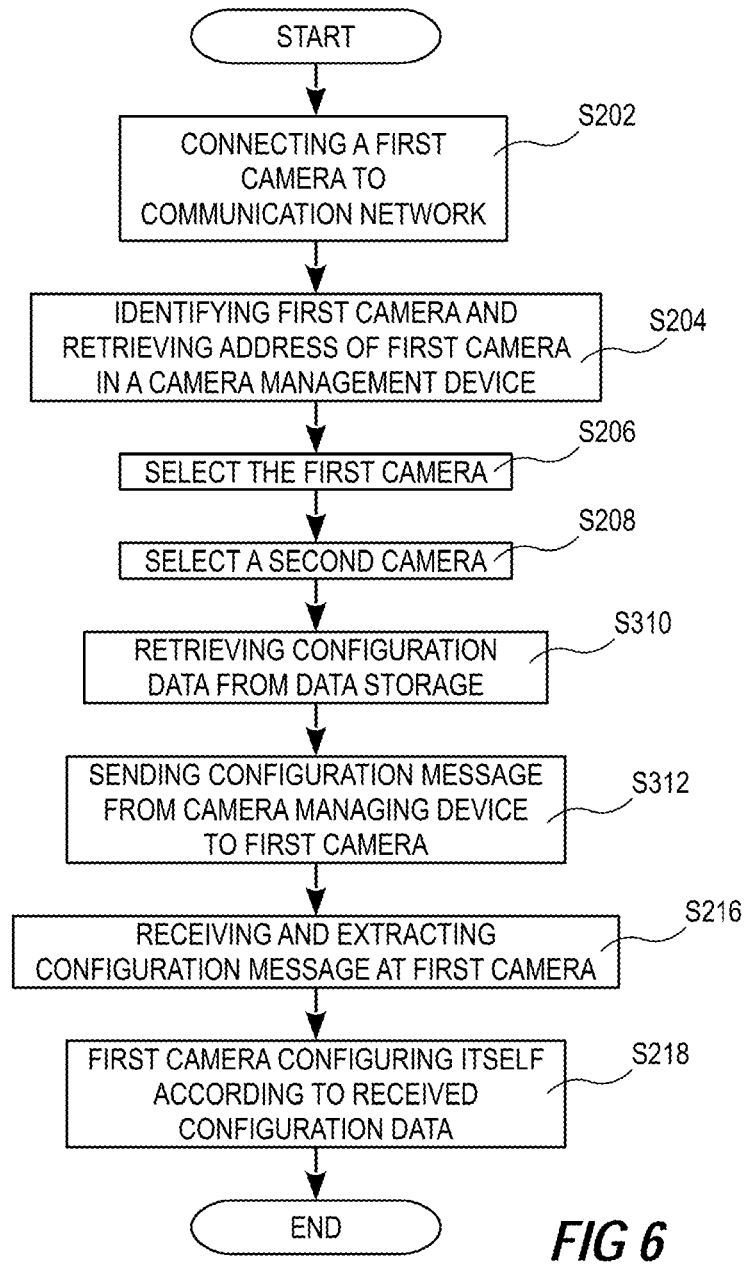
FIG. 6 is a flowchart of a configuration process according to at least some embodiments of the invention.

In FIG. 6 a process for alternative embodiments is depicted. The process is very similar to the process described in connection with FIG. 5, however, the response to the selection of a second camera 10a-10c, S208, i.e. the camera from which settings information shall be inherited, is to retrieve settings information of the second camera 10a-10c from a data storage, S310. The data storage may be internal to the camera managing device 14 or it may be in a networked data storage device such as an information server 16, see alternatives listed above. Then the camera managing device 14 generates a configuration message from the retrieved data and sends it to the first camera 10d, S312, where the first camera 10d extracts the settings information of the configuration message as described in connection with step S216 in FIG. 5, and then continues the process described in connection with step S218 in FIG. 5.

Alternatively, not shown in any figures, an information server 16 storing the configuration data relating to the cameras 10a-10c of the camera system may be configured to generate and send the configuration message including the configuration data of the second camera.

What is claimed is:

1. A method for configuring a first camera, said method comprising:
   receiving in a camera managing device a position signal identifying coordinates of the position of the camera managing device;
   identifying in the camera managing device all cameras within a predetermined distance from the coordinates of the position of the camera managing device by calculating the distance to the coordinates of the positions of cameras in a system of networked cameras, comparing the distance to each camera to a threshold value, and identifying the cameras that are positioned at a distance from the camera managing device that is less than the threshold value, wherein the threshold value is the predetermined distance;
   presenting a visual representation of the identified cameras, including a second camera, in the camera managing device;
   presenting a visual representation of the first camera in the camera managing device;
   connecting the visual representation of the first camera to the visual representation of the second camera by selecting the first camera and then the second camera by means of a corresponding drag and drop operation;
   transferring, to the first camera, settings information related to the second camera in response to said connecting of the visual representation of the first camera to the visual representation of the second camera; and
   configuring the first camera using the transferred settings information.

2. The method according to claim 1, wherein said settings information includes identification of a physical position of the second camera.

3. The method according to claim 1, wherein said settings information includes any information type from the group of white balance, frame rate, exposure, compression level, encoding format, and triggering event.

4. The method according to claim 1, further comprising positioning the visual representation of the second camera in a map presented on the camera managing device.

5. The method according to claim 1, further comprising displaying at the camera managing device a map of the surroundings of the camera managing device by selecting a map view including the coordinates of the position of the camera managing device.

6. A monitoring system including cameras and a camera managing device all connected to a communication network, wherein the camera managing device and the cameras are configured to perform the method of claim 1.

* * * * *